April 30, 1963 R. B. FITCH ET AL 3,087,419
TWO-SIZE AUTOMATIC BOX CLOSING MACHINE
Filed Nov. 29, 1960 5 Sheets-Sheet 3
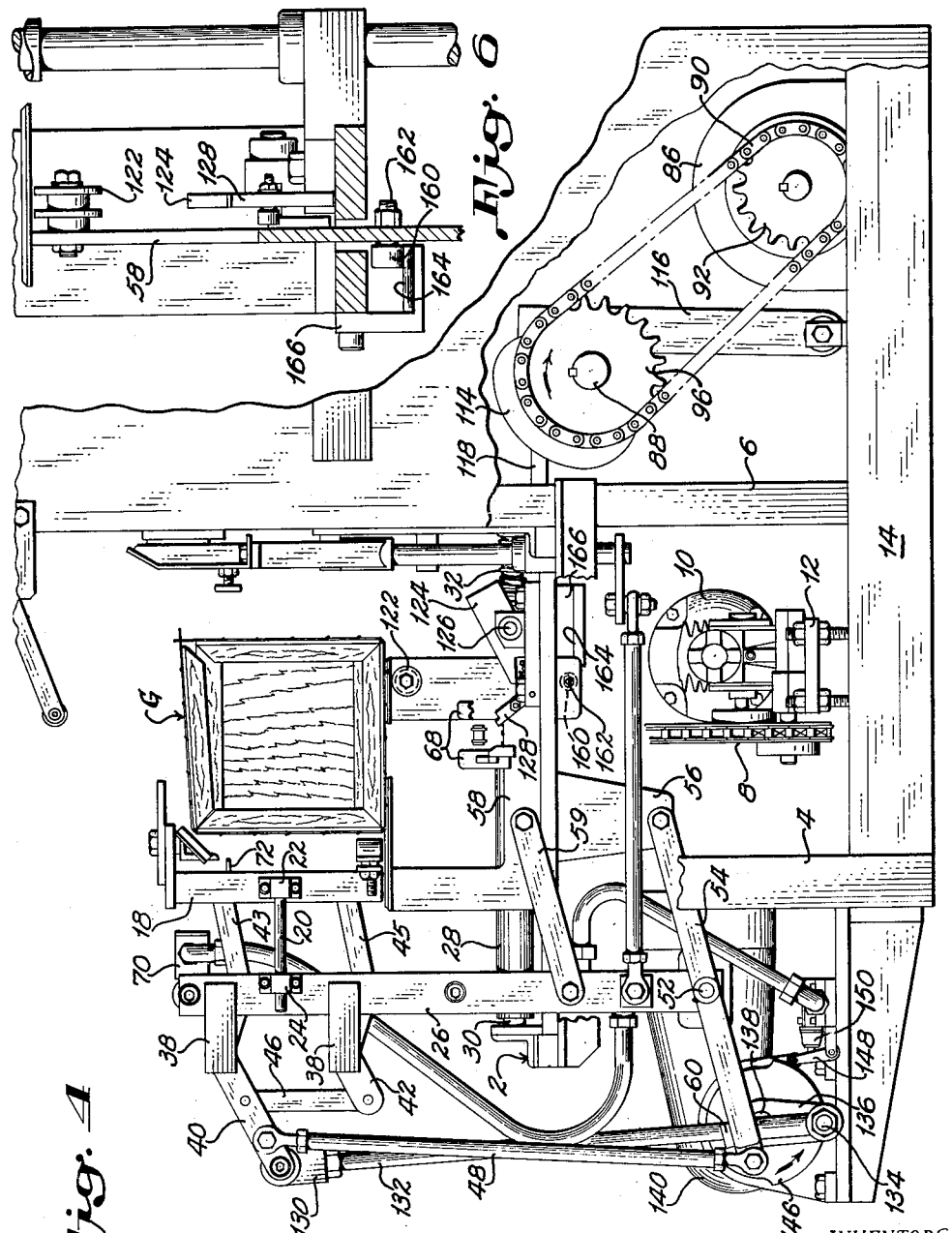
INVENTORS
Robert B. Fitch
Nicholas Horvath, Jr.
BY Curtis, Morris & Safford
ATTORNEYS

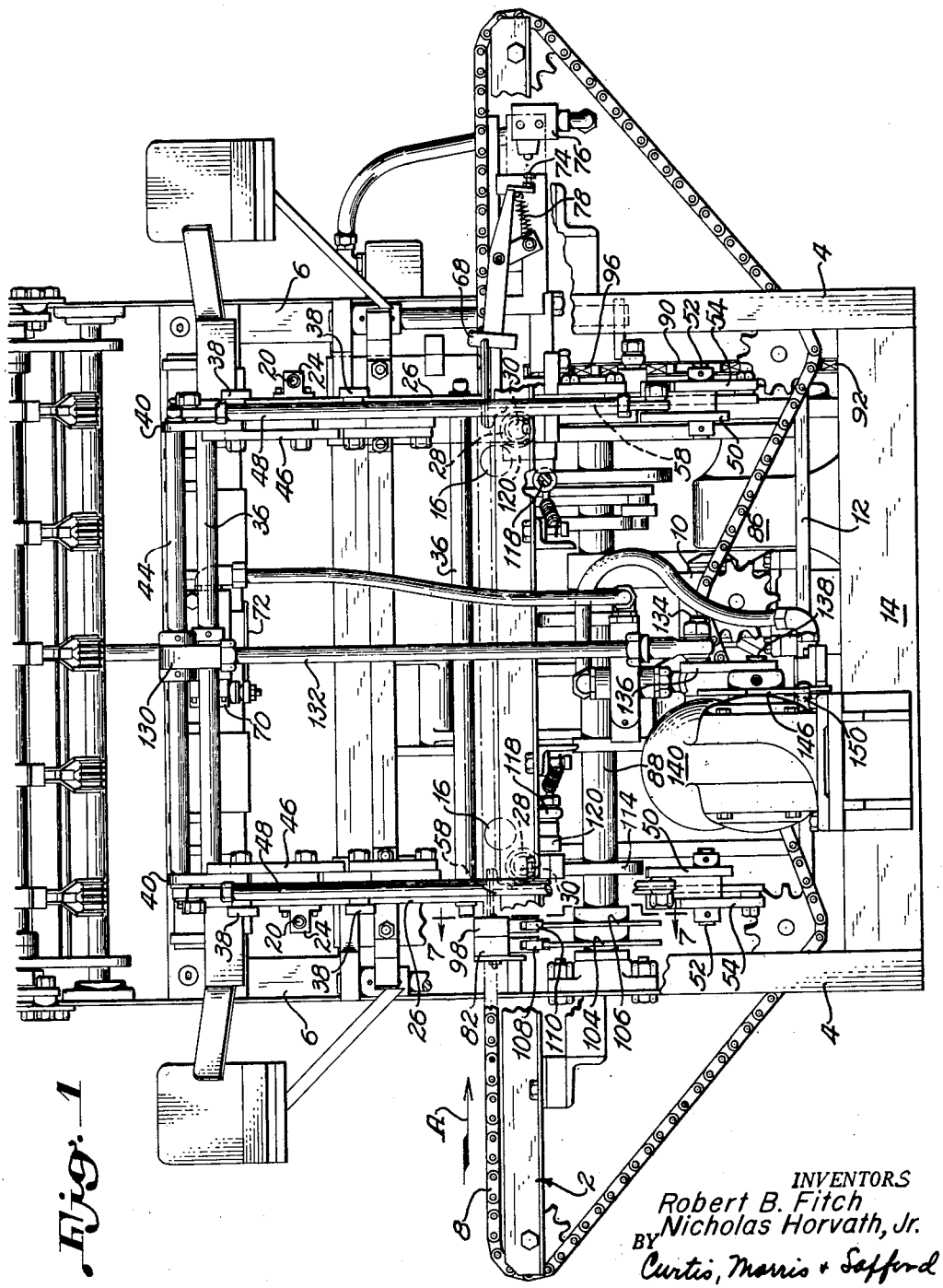

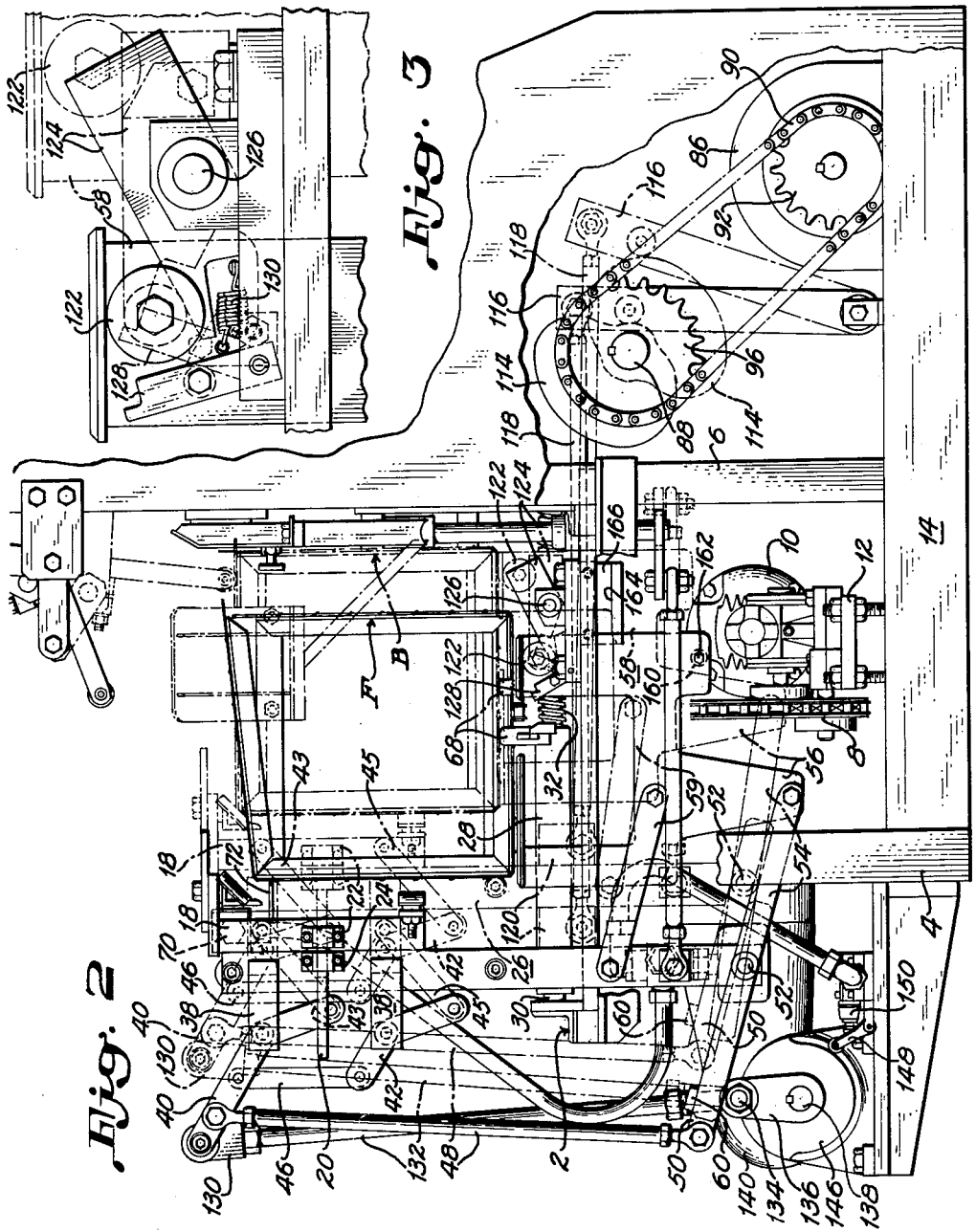

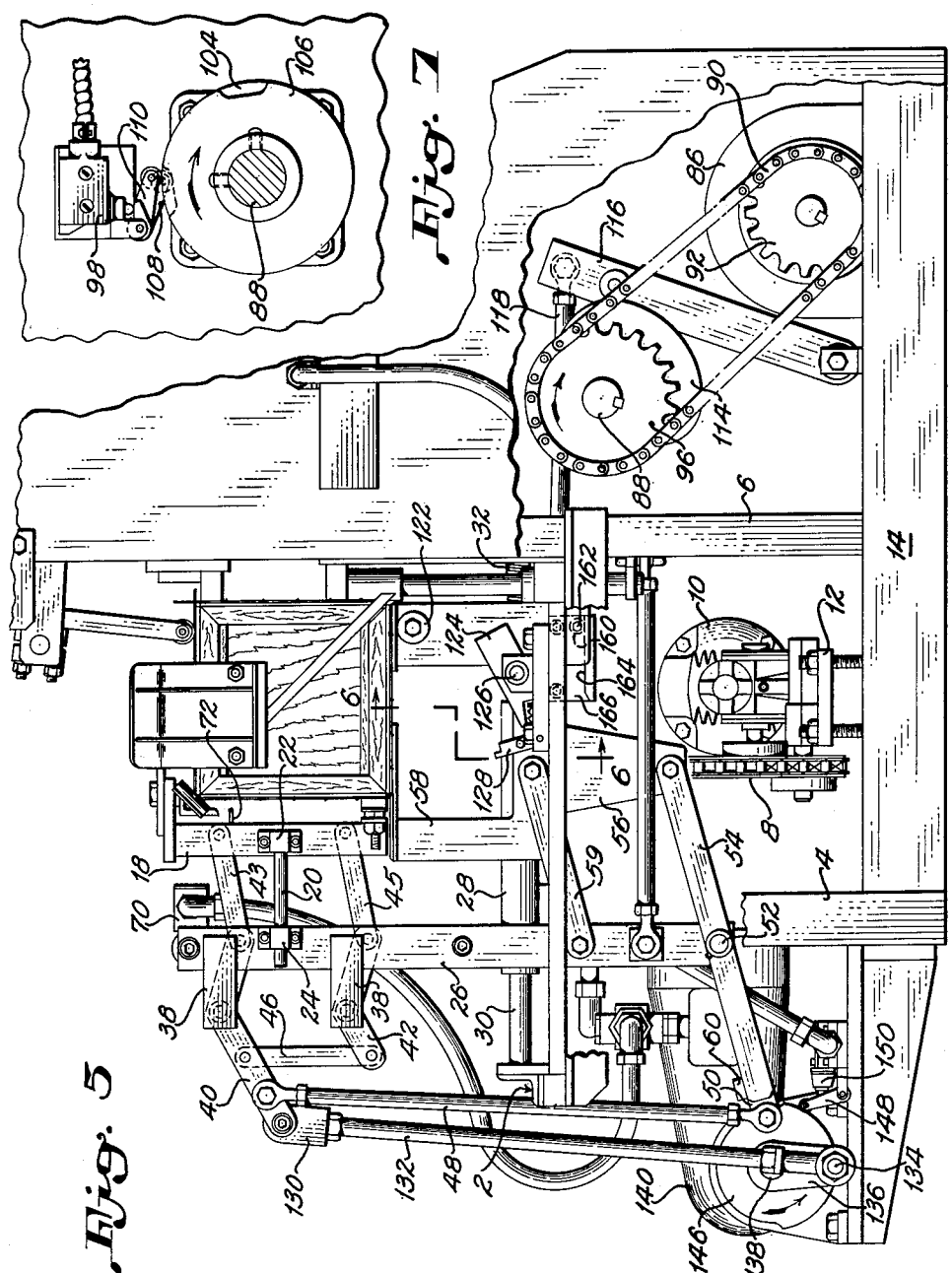

INVENTORS
Robert B. Fitch
Nicholas Horvath, Jr.
BY Curtis, Morris & Safford
ATTORNEYS.

3,087,419
Patented Apr. 30, 1963

3,087,419
TWO-SIZE AUTOMATIC BOX CLOSING MACHINE
Robert B. Fitch, Montville, and Nicholas Horvath, Jr., Rockaway, N.J., assignors to Stapling Machines Co., Rockaway, N.J., a corporation of Delaware
Filed Nov. 29, 1960, Ser. No. 72,491
2 Claims. (Cl. 100—49)

This invention relates generally to machines for closing wirebound boxes and crates and particularly to improvements in wirebound box and crate closing machines of the general type disclosed in United States Patents No. 2,517,710, No. 2,550,292 and No. 2,565,987 to provide automatically controlled mechanism for adapting such machines to perform a closing operation on two sizes of wirebound boxes, of different dimensions in either depth or width, or both.

Heretofore, the type of closing machine illustrated and described in the above-mentioned patents were especially constructed to receive and close only one predetermined size of wirebound box. Other types of closing machines such as disclosed in copending applications Serial No. 699,115 (now Patent No. 2,988,214) and Serial No. 754,336 (now Patent No. 3,039,381) include automatically operated mechanism which selects and closes a wirebound box of predetermined length and cross section, while permitting boxes of all other dimensions to pass freely through the machine without closing.

The present machine embodying the invention has incorporated therein an electrical measuring system which will identify either of two sizes of wirebound boxes as the boxes move into the machine. When a larger box is stopped in proper position within the machine, the closing operation is performed immediately and the box is ejected. When a smaller box is fed into the machine to the stop position, the electrical measuring system causes the machine automatically to adapt itself to the smaller size box prior to performing the closing operation. Near the completion of the closing cycle, all of the elements of the machine are reset at their original positions and the smaller box is ejected. Since the machine is fully automatic in all of its operations, the two sizes of wirebound boxes may be fed into the machine in random order.

In the drawings:
FIGURE 1 is a side elevational view of a wirebound box closing machine embodying features of the invention, as viewed from the side supporting the conveyor mechanism.

FIGURE 2 is an end elevational view of the machine, as viewed from the end appearing at the right-hand side of FIGURE 1, showing in full lines a larger size wirebound box as it reaches the stop position in the machine and in broken lines the box moved upwardly and to the right to box-closing position.

FIGURE 3 is an enlarged fragmentary view of a portion of the mechanism shown in FIGURE 2.

FIGURE 4 is an end view of the machine, similar to FIGURE 2 but showing the size-changing mechanism moved to accommodate a smaller size wirebound box.

FIGURE 5 is a view similar to FIGURE 4 but showing the smaller wirebound box moved to closing position.

FIGURE 6 is an enlarged fragmentary sectional view taken on the line 6—6 of FIGURE 5.

FIGURE 7 is an enlarged fragmentary sectional view taken on the line 7—7 of FIGURE 1.

Figure 8:
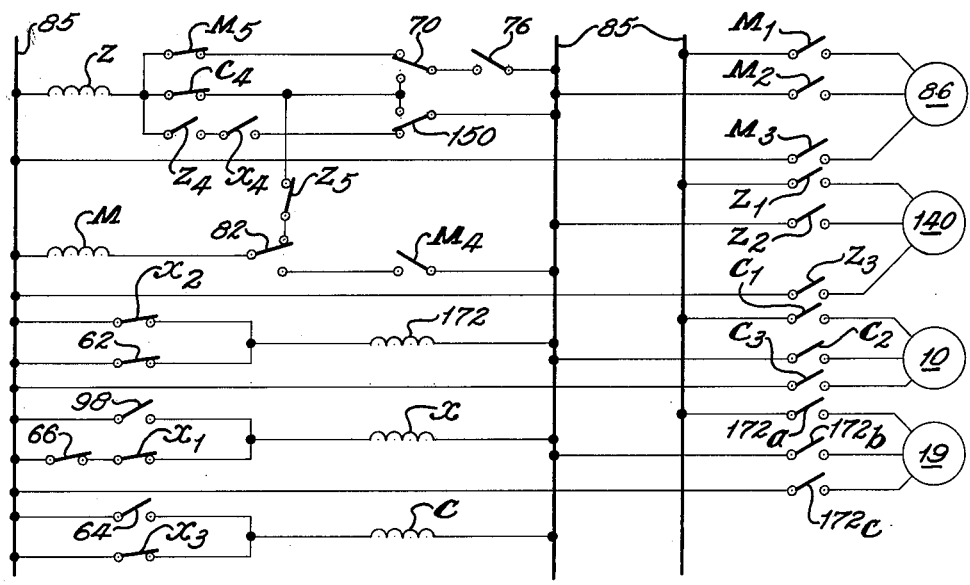
FIGURES 8 and 9 are schematic diagrams of two alternative electrical control circuits for the machine.

At the outset, it should be observed that some of the component members and mechanisms of the machine are either not described or are omitted from the drawings for purposes of clarity, since they are shown and described in one or more of the aforementioned patents to which reference is made for a fuller understanding of the overall operation of the machine.

As may be seen in FIGURE 1, the machine includes an elongated open framework bed 2 which is suitably cross braced, with legs 4 supporting the adjacent side, as viewed in the figure, while the remote side of the bed is supported on vertical members 6 (FIGURES 2, 4 and 5). Supported and guided for lengthwise movement along the center line of bed 2 is a conveyor chain 8, which is driven by an electric motor 10 mounted on a support plate 12 secured to a base member 14. As the conveyor chain moves the wirebound boxes in the machine, they are also supported on a series of rollers 16. As indicated by the arrow A in FIGURE 1, the work moves from left to right, however, the machine may be easily arranged to receive and operate upon work which is fed into it in the opposite direction.

In FIGURES 1, 2, 4 and 5 there is shown the mechanism for adapting the machine to accommodate different sizes of wirebound boxes. FIGURES 2, 4 and 5 show this mechanism as viewed from the right-hand side of the machine; although only the parts at this end of the machine are shown in these figures and described herein, it will be understood that the opposite side of the machine includes duplicates of most of these parts, with each pair of corresponding parts operating in synchronism. As may be seen in these figures, a short, vertical member 18 is supported above the outer portion of bed 2 by a short horizontal shaft 20 having one end fixed in a bracket 22 attached to the outer face of member 18, this shaft 20 being slidably supported in a bracket 24 fastened to the outer face of a vertical post 26 so that the vertical member 18 is horizontally movable relative to the post 26. At approximately the center of the post 26, it is fixed to a cylindrical sleeve 28 which is slidably mounted on a fixed horizontal rod 30 extending transversely of the bed 2, so that the post 26 is also horizontally movable. Sleeve 28 and its associated members are yieldingly maintained in their neutral or starting position, in which they are shown in full lines in FIGURE 2, by a compression spring 32 encircling rod 30.

The two posts 26 are braced by tie rods 36 (FIGURE 1) and each has integrally secured to the outer face of its upper portion a pair of horizontal brackets 38 (FIGURES 2, 4 and 5), which are suitably spaced apart to provide means for pivotally supporting a pair of parallel levers 40 and 42. The right-hand end of the upper lever 40 is pivotally connected to the upright 18 by a link 43 while its left-hand end is connected to a horizontal bar 44. The right-hand end of the lower lever 42 is also pivotally connected to vertical member 18 by a link 45, while its left-hand end is connected by a link 46 to the upper lever 40 for movement in unison therewith.

A drive rod 48 connects the left-hand ends of the two levers 40 and 50, being pivotally connected at each end to said levers. The short lever 50 and the lever 54 are each pivotally mounted on the vertical post 26, at its inner and outer faces, respectively, by a short shaft 52 which projects through post 26. The inner end of lever lever 54 is pivotally secured to the depending leg member 56 of a vertically positioned, generally Y-shaped plate member 58, which is further supported for vertical movement by a parallel link 59 pivotally secured to vertical member 26. Lever 54 is caused to rotate in a counterclockwise direction by an ear 60 projecting laterally from the upper surface of short lever 50 adjacent its outer end, this ear 60 engaging the upper surface of the free end of lever 54 when drive rod 48 moves downwardly. Rod 48 is driven up and down by lever 40, which in turn is driven by size change drive motor 140 through crank arm 136, drive rod 132, head member 130 and bar 44. When rod 48 moves downwardly, it rotates the levers 50 and 54 in a counterclockwise direction, causing the Y-shaped plate member 58 to move upwardly, lifting the box. At the same time, the levers 40 and 42 are rotated in a counterclockwise direction, causing the vertical member 18 to move inwardly toward the box. These combined upward and inward movements adapt the machine to accommodate a box of smaller cross-sectional dimensions.

Closing of Larger Size Boxes

With reference to the circuit diagram of FIGURE 8, as well as to FIGURES 1 and 2, the action of the electrical controlling devices will be described for the sequence of infeeding, stopping, closing and outfeeding the larger of the two box sizes which can be accommodated. FIGURE 8 illustrates the neutral condition of the circuit, when there are no boxes in the machine or on the separate infeed conveyor (not shown here). The winding X of the reset relay is energized to close contacts $X_1$, $X_2$ and $X_3$, contacts $X_1$ completing a holding circuit to keep the winding X of the relay energized, contacts $X_2$ energizing the winding 172 of the infeed conveyor motor relay and contacts $X_3$ energizing the winding C of the chain conveyor motor relay. The energization of the winding 172 closes contacts 172a, 172b and 172c to connect the separate infeed conveyor motor 19 (shown only in FIGURE 8) to the three-phase power line 85, while the energization of the winding C closes contacts $C_1$, $C_2$ and $C_3$ to energize the chain conveyor motor 10 (FIGURES 1 and 2), the feed boxes into the machine.

As a larger box approaches the machine on the separate infeed conveyor, it contacts the actuating arms of a number of control switches mounted alongside the infeed conveyor in the manner illustrated in the aforementioned application Serial No. 754,336. The first switch thus actuated is the normally closed single-pole, single-throw infeed motor control switch 62 (FIGURES 8 and 9), which is thereby opened and held open as long as the box remains in contact with its actuating arm. As contact $X_2$, which is connected in parallel with switch 62, has already been closed, no effect is now produced. The second switch to be actuated by contact with incoming box is the normally open single-pole, single-throw conveyor chain motor control switch 64 (FIGURES 8 and 9), which is thereby closed and completes a parallel circuit to the chain motor control relay winding C as long as the box remains in contact with the actuating arm of switch 64.

As the box proceeds off of the separate infeed conveyor and onto the conveyor chain 8, it leaves contact with the actuating arm of switch 62, allowing the switch to return to its normally closed position, completing a circuit to the infeed motor control relay winding 172. The box next engages the actuating arm of the normally closed release switch 66 which opens the circuit to the winding X of the reset relay, de-energizing the relay and opening its contacts $X_1$, $X_2$ and $X_3$ and closing contact $X_4$.

Referring to FIGURE 1, as the box is moved into the machine by the conveyor chain 8, it leaves contact with the actuating arm of the conveyor chain control switch 64, allowing the switch to return to its normally open position, opening the circuit to the winding C of the conveyor chain motor relay opening its contacts $C_1$, $C_2$, $C_3$ and $C_4$ and causing the conveyor chain motor 10 to be de-energized. As the conveyor chain 8 and the box continue to coast toward the box stop 68, the box contacts the actuating arm 72 of the single-pole, double-throw height measuring switch 70, throwing the switch to the position opposite to that shown in FIGURE 8.

The box continues to coast until it strikes the box stop 68, pushing it to the right against the resilient restraint of the springs 78. Just prior to striking the box stop 68, the box leaves contact with the actuating arm of release switch 66, allowing the switch to return to its normally closed position.

When the box engages and moves the box stop 68, the stud 74 (FIGURE 1) will actuate the normally open, single-pole, single-throw box stop switch 76 and complete a circuit through the previously actuated measuring switch 70, the normally closed relay contacts $Z_5$ and switch 82 to the winding M of the main drive motor relay. This closes the relay contacts $M_1$, $M_2$ and $M_3$ which connect the three-phase power line 85 to the main drive motor 86. At the same time, relay contacts $M_4$ are closed and contacts $M_5$ are opened. The main drive motor 86 (FIGURE 2) starts to turn and drives the cam shaft through sprocket 92, chain 90 and sprocket 96. As described in the aforementioned patents, the cam shaft 88 thus drives the box closing mechanism through a box closing operation.

As may be seen in FIGURES 1 and 7, a pair of electric switches 82 and 98 is positioned side by side above the cam shaft 88. Adjustably mounted on the cam shaft 88 are two cams 104 and 106, which respectively engage the cam followers 108 and 110 of the switches 82 and 98. Shortly after cam shaft 88 begins to rotate, cam follower 108 rides out of a depression in cam 104, as shown in FIGURE 7, actuating switch 82 and throwing its contacts to the position opposite to that shown in FIGURE 8. This maintains the circuit to the winding M of the main drive motor relay through switch 82 and holding contacts $M_4$. The main drive motor 86 continues to run and to drive cam shaft 88 and cam 114 (FIGURE 2) thereon.

As cam 114 rotates, it moves the lever 116 and the pivotally attached rod 118 toward the right. The opposite end of rod 118 is pivotally secured to a tab 120 (FIGURE 1) secured to the inner side of sleeve 28 and depending therefrom. Thus the vertical post 26, which is also fastened to sleeve 28, and the associated mechanism previously described, are moved inwardly of the machine. As this occurs, a freely rotating roller 122 secured to the upper right-hand portion of the Y-shaped plate member 58 rides up and astride the inclined top surface of a lever 124 pivotally mounted on a stud 126.

As roller 122 rides past the fulcrum of lever 124, it rocks the lever to a horizontal position, permitting a latch 128 to be moved by a spring 130 into locking position beneath the left-hand end of the lever, where it remains until the plate member 58 and roller 122 move back to the left near the end of the cycle. Thus, the box is raised and moved inwardly of the machine from its position indicated by full lines F in FIGURE 2 to the position indicated by broken lines B, in which it is closed in the manner described in the aforementioned patents. As the box is raised, box stop member 68 is permitted to be returned to its initial position by spring 78, thereby releasing the box stop switch 76.

As the machine approaches that stage of the closing cycle when the box has been completely closed and machine is returning to its neutral or starting position, the reset switch 98 (FIGURES 1 and 7) is released momentarily by the movement of the cam follower 110 into a recess in cam 106. This allows the normally closed switch 98 momentarily to complete a circuit through the winding X of reset relay which will be kept energized through the holding contacts $X_1$ and the normally closed release switch 66.

The energization of winding X will also close contacts $X_2$ to complete a circuit to the winding 172 of the infeed conveyor motor relay and initiate the infeeding of a second box if one has arrived in proper position. It also closes the relay contacts $X_3$, to complete a circuit to the winding C of the chain conveyor motor relay, which will cause the chain motor 10 to start and drive the chain 8 for ejection of the closed box and subsequent infeeding of the next box.

As the closing cycle continues toward neutral, the cam 104 on cam shaft 88 (FIGURES 1 and 7) releases cam follower 108, opening switch 82, and breaking the circuit to the winding M of the main drive motor relay, causing the main drive motor 86 to stop as all the elements of the machine reach their neutral position.

*Closing of Smaller Size Boxes*

Reference is now made to FIGURES 1, 4, 5 and 8 in describing the means and method by which the closing machine is caused to operate upon a wirebound box of smaller cross-sectional dimensions, by means of an electrical measuring system which automatically adapts the machine to shift the position of the box to compensate for its smaller size prior to the box closing cycle, and then, near the completion of the box closing cycle, as the smaller box is about to be ejected, automatically resets the machine to the neutral position to accommodate larger boxes.

As may be seen in these figures, the horizontal bar 44 to which the upper linkage 40 is pivotally secured, has loosely mounted thereon, at approximately its center portion, a head member 130 with a drive rod 132 threaded into its lower end. The lower end of the drive rod 132 is rotatably mounted on a stud 134 carried by a crank arm 136 driven by the motor 140. Fixed to the face of crank arm 136 is a cam 146 whose periphery, of which one-half is of reduced radius, engages a cam follower 148 which actuates a size-change stop switch 150.

As a smaller box, such as is indicated at G in FIGURE 4, is fed into the machine with its bottom supported at the same level as the larger size box, as shown in full lines F in FIGURE 2, it passes beneath arm 72 of switch 70 and moving further, strikes box stop member 68 and actuates switch 76. As may be seen in FIGURE 8, this closes the normally open contacts of switch 76, completing a circuit through the normally closed contacts of switch 70 and contacts $M_5$, to energize the winding Z of the size-change motor relay, closing its contacts $Z_1$, $Z_2$ and $Z_3$ and starting the size-change motor 140 (FIGURES 2 and 4). The resulting counterclockwise rotation of crank arm 136 causes drive rod 132 and the associated elements to move downwardly from the position shown in full lines in FIGURE 2 to that shown in FIGURE 4. This imparts a counterclockwise movement to lever 54, causing it to drive the Y-shaped plate member 58 upwardly, lifting the box supported thereon to the position shown in FIGURE 4 at which its top is at the same height as that of a box of the larger size when positioned for closing. At the same time, levers 40 and 42 are rotated in a counterclockwise direction from the position shown in full lines in FIGURE 2 to the position shown in FIGURE 4, pushing the vertical member 18 to the right a distance equal to the difference in width between the larger and smaller sizes of boxes.

As the box is raised, the box stop member 68 (FIGURE 1) is permitted to return to its neutral position, releasing switch 76. However, the closing of contacts $Z_4$ provides a holding circuit for the winding Z of size-change motor relay through contacts $R_4$ and the normally closed contacts of the size-change stop switch 150. When the drive shaft 138 of motor 140 has rotated approximately 180°, the cam 146 actuates the cam follower 148, throwing the size-change stop switch 150 to the position opposite that shown in FIGURE 8. This de-energizes the winding Z of the size-change motor relay and completes a circuit through the normally open contacts of stop switch 150, contacts $Z_5$ and main holding switch 82 to energize the winding M of the main drive motor relay. This starts the main drive motor 86 and imparts clockwise rotation to cam shaft 88, effecting the box-closing cycle, as described hereinbefore and shown in progress in FIGURE 5.

As an aid in supporting the Y-shaped plate member 58 during a closing operation on a smaller size wirebound box, there is provided a roller 160 rotatably mounted on a stud 162 secured to the inner face of and at the lower right-hand side of the plate member 58 (FIG. 4). As the plate member 58 is moved inwardly with the vertical post 26, roller 160 rides upon a shelf 164 of a fixed L-shaped bracket 166, as best shown in FIGURE 6.

Near the completion of the closing cycle, cam 106 of cam shaft 88 (FIGURES 1 and 7), momentarily actuates cam follower 110 and reset switch 98, energizing the winding X of the reset relay, closing its contacts $X_3$ to energize the winding C of the conveyor chain motor relay. This closes its contacts $C_4$ and energizes the winding Z of the size-change motor relay through the normally open but now closed contacts of the size-change stop switch 150. The size-change motor 140 is thus again energized, and cam 146 is rotated another 180°, returning it to tis neutral position and causing cam follower 148 to ride down into the reduced portion of the periphery of cam 146, releasing size-change stop switch 150 and de-energizing winding Z of the size-change motor relay and stopping size-change motor 140 with the parts of the size-change mechanism in their initial position, as shown in solid lines in FIG. 2.

As the cam shaft 88 continues to rotate, cam follower 108 is released by cam 104 on cam shaft 88, throwing switch 82 to the position shown in FIGURE 8 and breaking the circuit to the winding M of the main drive motor relay, stopping the main drive motor 86 as the several mechanisms return to rest in their initial positions, ready to receive the next box.

*Alternative Electrical Circuit*

Figure 9:
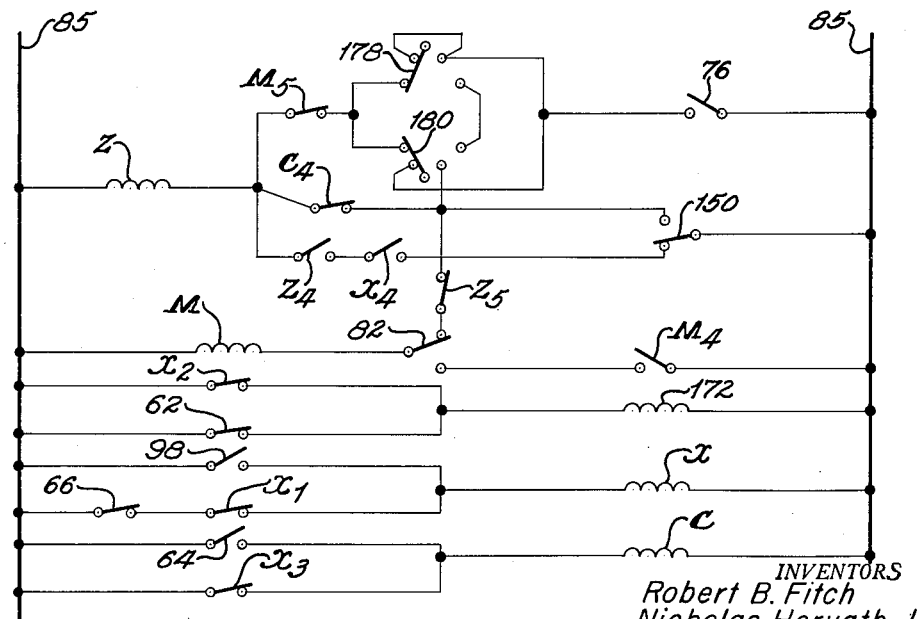

FIGURE 9 shows an alternative electrical measuring circuit which distinguishes between the two different sizes of wirebound boxes by measuring their width rather than their height. To accomplish this, there is provided a pair of width measuring electric switches 178 and 180 which are shown only in wiring diagram of FIGURE 9, but which are mounted at opposite sides of the path of the incoming boxes on the bed 2 (in the manner illustrated in the aforementioned application Serial No. 754,336). The transverse spacing of the two switches is such that a wider box will contact and actuate both switches, while a narrower box will contact only one of them, which may be either one of the two. The switches are actuated as a box enters the machine and before it coasts to a stop against the box stop member 68, actuating switch 76. As may be seen in FIGURE 9, the actuation of both width measuring switches 178 and 180 by a wider box, followed by actuation of the switch 76, completes a circuit through switch 76, the normally open contacts of switches 178 and 180, the normally closed contacts $Z_5$ to the winding M of the main drive motor relay. The main drive motor relay thus starts and stops the main drive motor 86, as previously described, without actuation of the size-change motor 140.

A narrower box moving into the machine will contact and actuate only one of the two width measuring switches 178 or 180 prior to coasting to a stop position against box stop member 68, actuating switch 76. As may be seen in FIGURE 9, actuation of either one of the two switches will complete a circuit through the unactuated switch and contacts $M_5$ to energize the winding Z of size-change motor relay. Winding Z is maintained energized through its holding contacts $Z_4$, the contacts $X_4$ of the reset relay and the normally closed contacts of the size-change stop switch 150. When the cam 146 has rotated 180°, the size-change stop switch 150 will be actuated by cam follower 148, de-energizing winding Z and stopping the size-change motor 140. Simultaneously, a circuit through the normally open contacts of size-change stop switch 150, contacts $Z_5$ and main holding switch 82 energizes winding M, thereby starting the main drive motor 86, which operates as previously described. Near the end of the closing cycle, when the winding X of the reset relay is re-energized as previously described, contacts X₃ complete a circuit to the winding C of the conveyor chain motor relay, closing contact C₄, and energizing the winding of the size-change motor relay and starting the size-change motor 140. When motor 140 has turned the crank 136 and cam 146 back to their initial position, the motor is stopped by cam follower 148 throwing switch 150 to the position shown in FIGURE 8.

It will thus be understood that either the circuit of FIGURE 9 or that of FIGURE 8 may be used to adapt the machine automatically to accommodate boxes of different sizes fed to the machine in random order. However, it should be emphasized that the specific embodiments of the invention described herein and shown in the accompanying drawings are intended as merely illustrative of the principles of the invention and not as limiting its scope, which is defined only by the appended claims.

We claim:

1. In a wirebound box closing machine of the type having movable box closing members for engaging fasteners at the closing corner of a wirebound box and bending the same to close said box, automatic means for adapting said machine for closing boxes of two different cross-sectional sizes, said means comprising a box supporting assembly movable between an outer position at which it supports boxes of the larger of said two sizes in proper position for closing and an inner position at which it supports boxes of the smaller of said two sizes in proper position for closing, first power means for moving said box supporting assembly between said two positions, a conveyor for feeding boxes into said machine, a stop switch having an actuating element positioned to be actuated by boxes of both of said sizes as they reach a predetermined position in said machine, second power means, box closer drive means connecting said second power means for driving said box closing members to engage and bend said fasteners to close said boxes, sensing means for measuring a selected one of the cross-sectional dimensions of said boxes as they are fed into said machine, said sensing means including a measuring switch, and a control circuit interconnecting said stop switch and said measuring switch for control of said first and second power means whereby actuation of said measuring switch by a box of said larger size before actuation of said stop switch causes said second power means to be energized to close said box without energization of said first power means, and actuation of said stop switch by a box of said smaller size which has not also actuated said measuring switch causes energization of said first power means to move said support assembly with said smaller box thereon to said inner position followed by energization of said second power means to close said smaller box, and subsequently by further energization of said first power means to return said support assembly and the closed box thereon to said outer position.

2. In a wirebound box closing machine of the type having movable box closing members for engaging fasteners at the closing corner of a wirebound box and bending the same to close said box, automatic means for adapting said machine for closing boxes of two different cross-sectional sizes, said means comprising a box supporting assembly movable between an outer position at which it supports boxes of the larger of said two sizes in proper position for closing and an inner position at which it supports boxes of the smaller of said two sizes in proper position for closing, first power means for moving said box supporting assembly between said two positions, a conveyor for feeding boxes into said machine, a conveyor motor for driving said conveyor, a conveyor control switch having an actuating element positioned to be actuated by boxes of both of said sizes as they approach a predetermined stopping position in said machine and a stop switch having an actuating element positioned to be actuated by said boxes as they reach said stopping position, second power means, box closer drive means connecting said second power means for driving said box closing members to engage and bend said fasteners to close said boxes, sensing means for measuring a selected one of the cross-sectional dimensions of said boxes as they are fed into said machine, said sensing means including a measuring switch, a reset switch arranged to be actuated by an element associated with said box closer drive means upon completion of the box closing operation, and a control circuit interconnecting said conveyor control switch and said stop switch, said measuring switch and said reset switch for control of said conveyor motor and said first and second power means, whereby actuation of said conveyor control switch by a box of either of said two sizes deenergizes said conveyor motor and causes said conveyor to stop with the box in said stopping position and thereby actuate said stop switch and actuation of said stop switch by a box of said smaller size which has not also actuated said measuring switch causes energization of said first power means to move said support assembly and said smaller box thereon to said inner position followed by energization of said second power means to close said box, and subsequently by further energization of said first power means to return said support assembly and the closed box thereon to said outer position, and actuation of said stop switch by a box of said larger size which has also actuated said measuring switch causes said second power means to be energized to close said box without energization of said first power means and actuation of said reset switch upon completion of the box-closing operation on a box of either of said two sizes causes said motor to be re-energized to drive said conveyor to deliver the closed box out of said machine.

References Cited in the file of this patent
UNITED STATES PATENTS

| | | |
|---|---|---|
| 1,706,632 | Onstad | Mar. 26, 1929 |
| 1,945,455 | Wallace | Jan. 30, 1934 |
| 2,108,548 | Paxton | Feb. 15, 1938 |
| 2,517,710 | Platt et al. | Aug. 8, 1950 |
| 2,835,385 | Eckart | May 20, 1958 |